|| US012500976B2

(12) United States Patent
Ok et al.

(10) Patent No.: US 12,500,976 B2
(45) Date of Patent: Dec. 16, 2025

(54) ELECTRONIC DEVICE INCLUDING EXPANDABLE DISPLAY AND OPERATION METHOD THEREOF

(71) Applicant: SAMSUNG ELECTRONICS CO., LTD., Suwon-si (KR)

(72) Inventors: Yunsu Ok, Suwon-si (KR); Youngmok Kim, Suwon-si (KR); Hyelin Lee, Suwon-si (KR); Dahee Lim, Suwon-si (KR); Minjung Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 357 days.

(21) Appl. No.: 18/121,859

(22) Filed: Mar. 15, 2023

(65) Prior Publication Data
US 2023/0224401 A1   Jul. 13, 2023

Related U.S. Application Data

(63) Continuation of application No. PCT/KR2021/012278, filed on Sep. 9, 2021.

(30) Foreign Application Priority Data

Dec. 3, 2020   (KR) .................. 10-2020-0167866
Jan. 28, 2021   (KR) .................. 10-2021-0012331

(51) Int. Cl.
*H04M 1/02* (2006.01)
*H04M 1/72403* (2021.01)
*H04M 1/72454* (2021.01)

(52) U.S. Cl.
CPC ..... *H04M 1/72454* (2021.01); *H04M 1/0235* (2013.01); *H04M 1/72403* (2021.01); *H04M 2201/38* (2013.01)

(58) Field of Classification Search
CPC ............. H04M 1/0241; H04M 1/0268; H04M 2250/22; H04M 1/72454; H04M 1/0235;
(Continued)

(56) References Cited

U.S. PATENT DOCUMENTS 9,589,529 B2   3/2017   Kim
10,379,720 B2   8/2019   Ryu et al.
(Continued)

FOREIGN PATENT DOCUMENTS

JP   2017-142657       8/2017
JP   2017142657 A *   8/2017
(Continued)

OTHER PUBLICATIONS

International Search Report for PCT/KR2021/012278 mailed Dec. 8, 2021, 4 pages.
(Continued)

*Primary Examiner* — Angelica Perez
(74) *Attorney, Agent, or Firm* — NIXON & VANDERHYE P.C.

(57) ABSTRACT

An electronic device according to various embodiments of the present disclosure may comprise: a display which can be expanded or reduced; at least one sensor; and a processor, wherein the processor is configured to: identify whether an input is received; based on identifying that an input has been received, identify whether the display is expanded or reduced within a given period of time, using the at least one sensor; and based on identifying that expansion or reduction of the display is started within the given period of time, execute a specified function corresponding to the identified input.

13 Claims, 13 Drawing Sheets

(58) Field of Classification Search
CPC .......... H04M 1/72403; H04M 2201/38; G06F 3/041; G06F 3/0484; G06F 3/0488; G06F 9/451
See application file for complete search history.

(56) References Cited

U.S. PATENT DOCUMENTS

| | | |
|---|---|---|
| 10,452,156 B2 | 10/2019 | Kang et al. |
| 2014/0218375 A1 | 8/2014 | Kim |
| 2014/0306908 A1 | 10/2014 | Nagaraju |
| 2015/0148106 A1 | 5/2015 | Choi et al. |
| 2016/0373654 A1* | 12/2016 | Kwon .................... G09G 5/373 |
| 2018/0329514 A1* | 11/2018 | Kwon ...................... G06F 3/03 |
| 2018/0357985 A1* | 12/2018 | Park ....................... G09G 5/005 |
| 2018/0374452 A1 | 12/2018 | Choi et al. |
| 2019/0278336 A1 | 9/2019 | Choi et al. |
| 2019/0346954 A1 | 11/2019 | Jung et al. |
| 2020/0076940 A1 | 3/2020 | Kim et al. |
| 2021/0405857 A1 | 12/2021 | Kim et al. |
| 2023/0029563 A1 | 2/2023 | Choi et al. |

FOREIGN PATENT DOCUMENTS

| | | | |
|---|---|---|---|
| KR | 10-2014-0100149 | | 8/2014 |
| KR | 10-2014-0122665 | * | 10/2014 |
| KR | 10-2017-0038308 | | 4/2017 |
| KR | 10-2017-0060519 | | 6/2017 |
| KR | 10-1784880 | | 10/2017 |
| KR | 10-2115186 | | 5/2020 |
| KR | 10-2021-0146095 | | 12/2021 |
| KR | 10-2022-0000270 | | 1/2022 |
| KR | 10-2022-0084318 | | 6/2022 |

OTHER PUBLICATIONS

Written Opinion of the ISA for PCT/KR2021/012278 mailed Dec. 8, 2021, 4 pages.
Korean Office Action issued Feb. 4, 2025 in corresponding Korean Patent Application No. 10-2021-0012331.

* cited by examiner

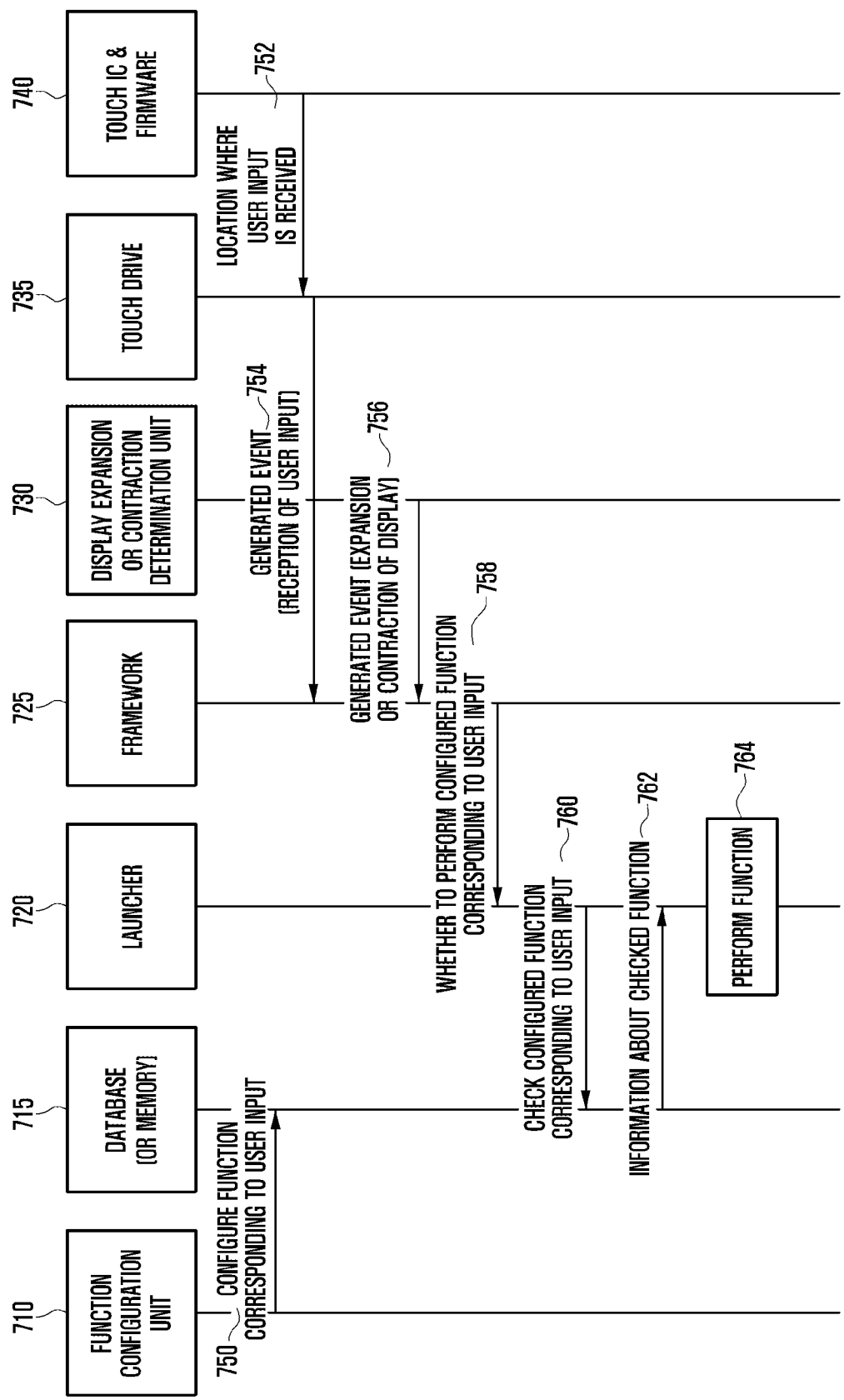

FIG. 12A
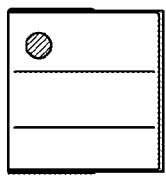 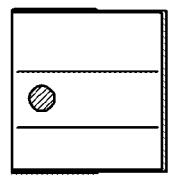 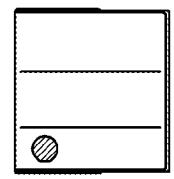
FIG. 12B
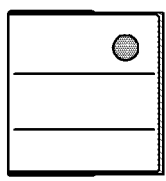 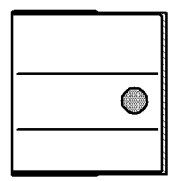 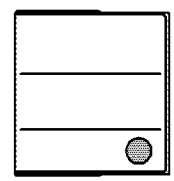
FIG. 12C
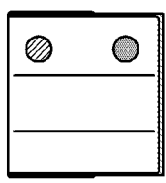 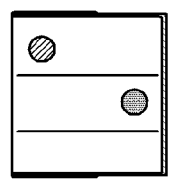 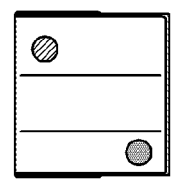
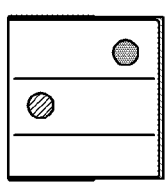 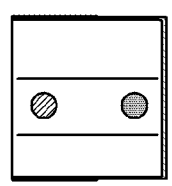 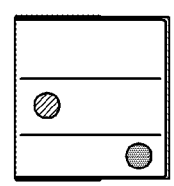
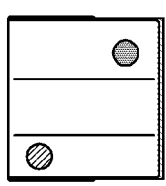 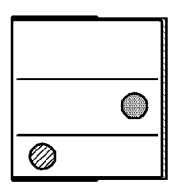 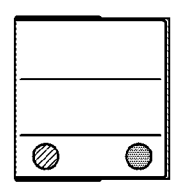

FIG. 13
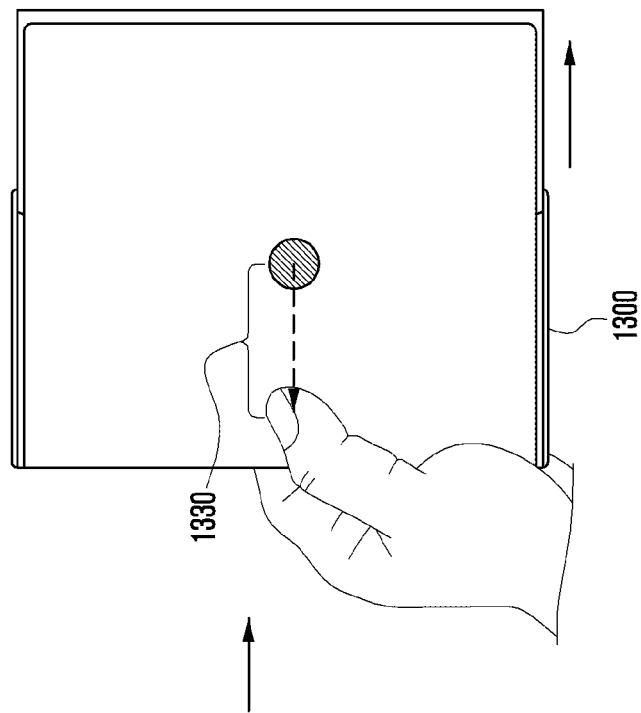
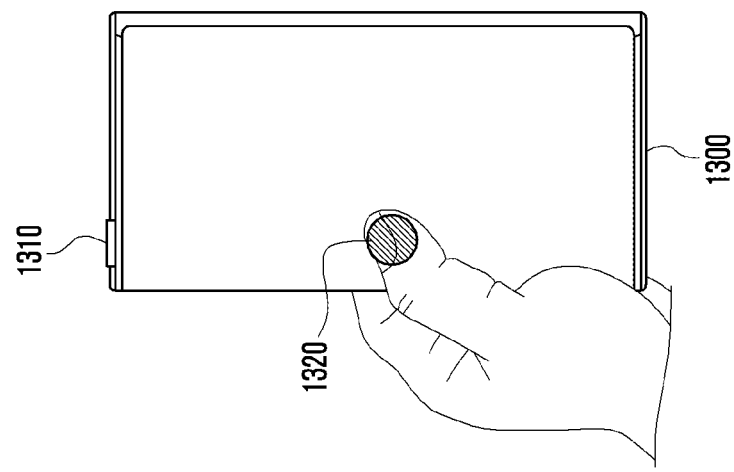

ELECTRONIC DEVICE INCLUDING EXPANDABLE DISPLAY AND OPERATION METHOD THEREOF

CROSS-REFERENCE TO RELATED APPLICATIONS

This application is a continuation of International Application No. PCT/KR2021/012278 designating the United States, filed on Sep. 9, 2021, in the Korean Intellectual Property Receiving Office and claiming priority to Korean Patent Application No. 10-2020-0167866, filed on Dec. 3, 2020, in the Korean Intellectual Property Office, and to Korean Patent Application No. 10-2021-0012331, filed on Jan. 28, 2021, in the Korean Intellectual Property Office, the disclosures of all of which are incorporated by reference herein in their entireties.

BACKGROUND

Field

The disclosure relates to an electronic device including an expandable display and, more particularly, to contents displayed on a display as the display is expanded or contracted.

Description of Related Art

With a significant decrease in the functional gap between electronic devices by manufacturers, electronic devices have gradually become slimmer to meet consumers' purchasing need, and electronic devices with increased strength and improved design as well as differentiated functional elements are being developed. For example, an electronic device including an expandable display is being developed such that the electronic device has a compact size to be conveniently carried by a user and the display is expandable in use to be conveniently used by the user.

When a display of an electronic device is capable of expanding or contracting, a user may inconveniently need to separately select content to be displayed on an expanded or contracted screen.

SUMMARY

An electronic device according to various example embodiments of the disclosure may include: an expandable or contractible display, at least one sensor, and a processor, wherein the processor may be configured to: identify whether an input is received, identify whether the display is expanded or contracted within a specified time using the at least one sensor based on identifying that the input is received, and execute a configured function corresponding to the identified input based on identifying that the display starts to be expanded or contracted within the specified time.

A method of operating an electronic device including an expandable or contractible display according to various example embodiments of the disclosure may include: identifying whether an input is received, identifying whether the display is expanded or contracted within a specified time using at least one sensor based on identifying that the input is received, and executing a configured function corresponding to the identified input based on identifying that the display starts to be expanded or contracted within the specified time.

A method of operating an electronic device including an expandable or contractible display according to various example embodiments of the disclosure may include: identifying whether an input is received, identifying whether the display is expanded or contracted within a specified time using at least one sensor based on identifying that the input is received, and executing a configured function corresponding to the identified input based on identifying that expansion or contraction of the display terminates within the specified time.

According to various example embodiments of the disclosure, when a display of an electronic device is capable of expanding or contracting, the electronic device may use expansion or contraction of the display as one option.

According to various example embodiments of the disclosure, a user may configure a frequently used function on an expanded display or contracted display, thereby conveniently performing the function without additional manipulation.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 7 is a signal flow diagram illustrating and example operation of an electronic device according to various embodiments;

FIGS. 12A, 12B and 12C are diagrams illustrating an example in which an electronic device recognizes a combination of a plurality of inputs to a display as a user input according to various embodiments; and FIG. 13 is a diagram illustrating an example in which an electronic device capable of automatically expanding or contracting a display recognizes a user input according to various embodiments.

DETAILED DESCRIPTION

Figure 1:
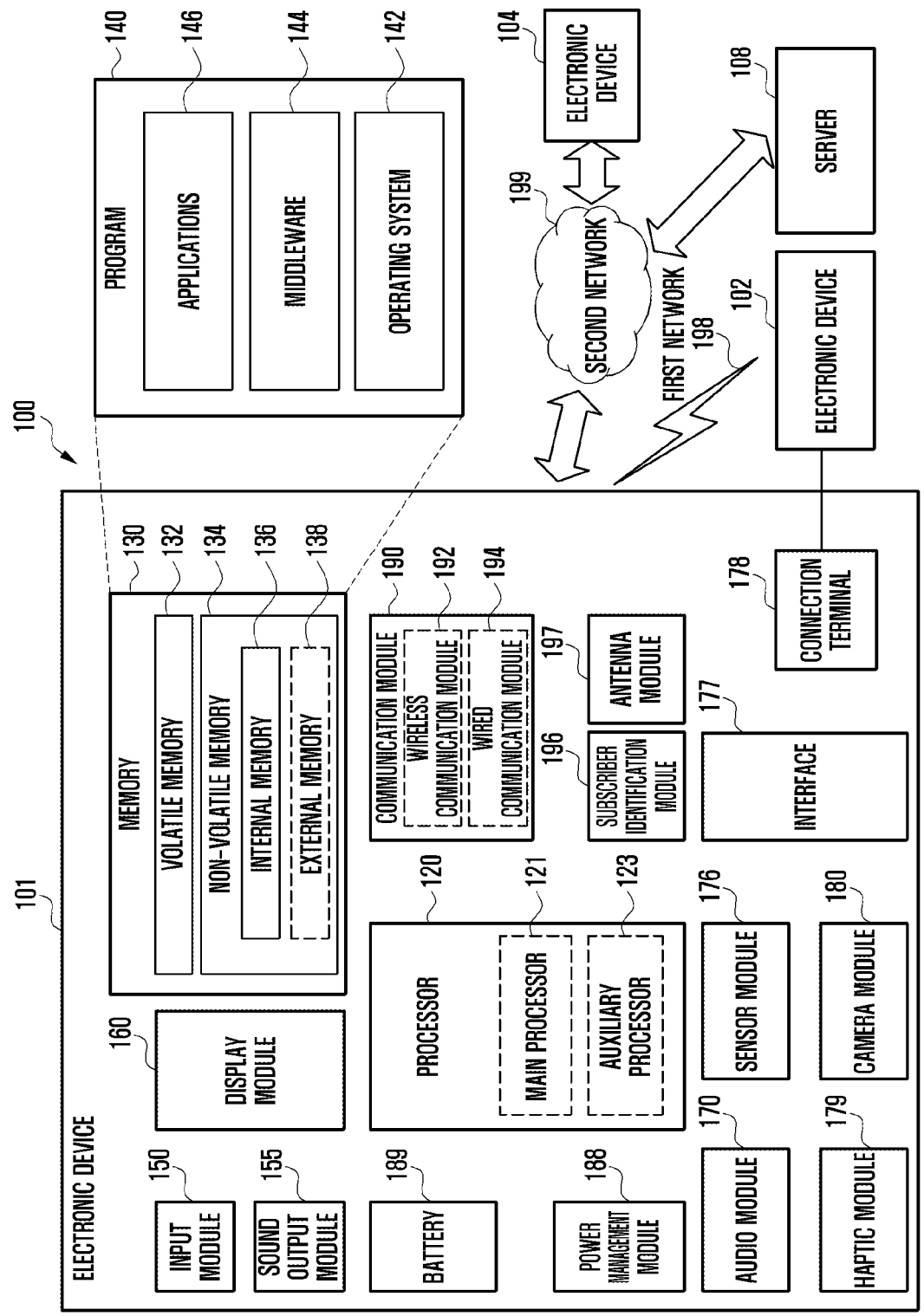
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
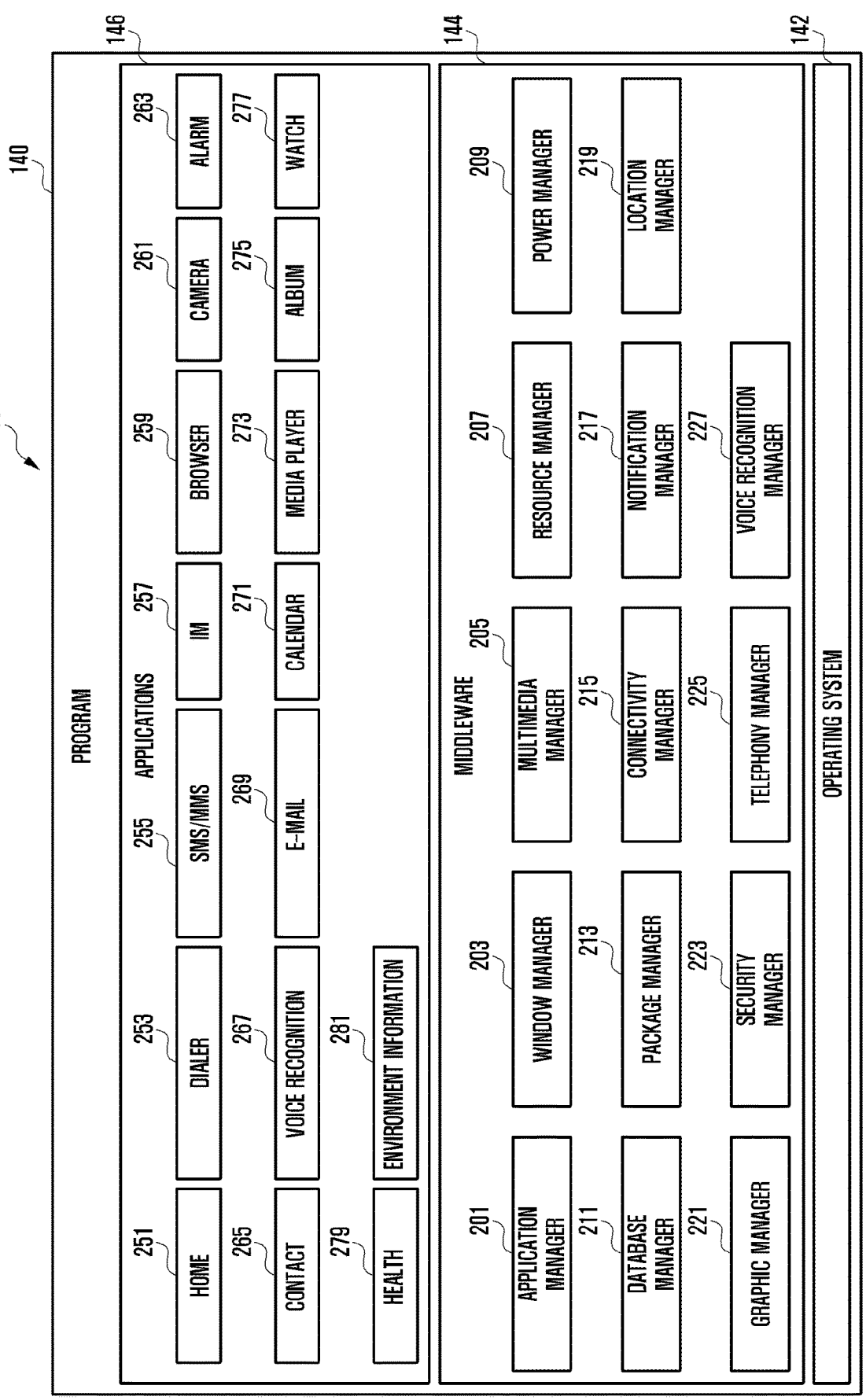
FIG. 2. is a block diagram illustrating an example program according to various embodiments.

FIG. 2 is a block diagram 200 illustrating the program 140 according to various embodiments. According to an embodiment, the program 140 may include an operating system (OS) 142 to control one or more resources of the electronic device 101, middleware 144, or an application 146 executable in the OS 142. The OS 142 may include, for example, Android™ iOS™, Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input module 150, the sound output module 155, the display module 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201, for example, may manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 209 may interwork with a basic input/output system (BIOS) (not shown) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, message, or alert). The location manager 219, for example, may manage locational information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 244 may dynamically delete some existing components or add new components. According to an embodiment, at least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to an embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display module or a camera module of the external electronic device). The device management application, additionally or alternatively, may support installation, delete, or update of an application running on the external electronic device.

Figure 3:
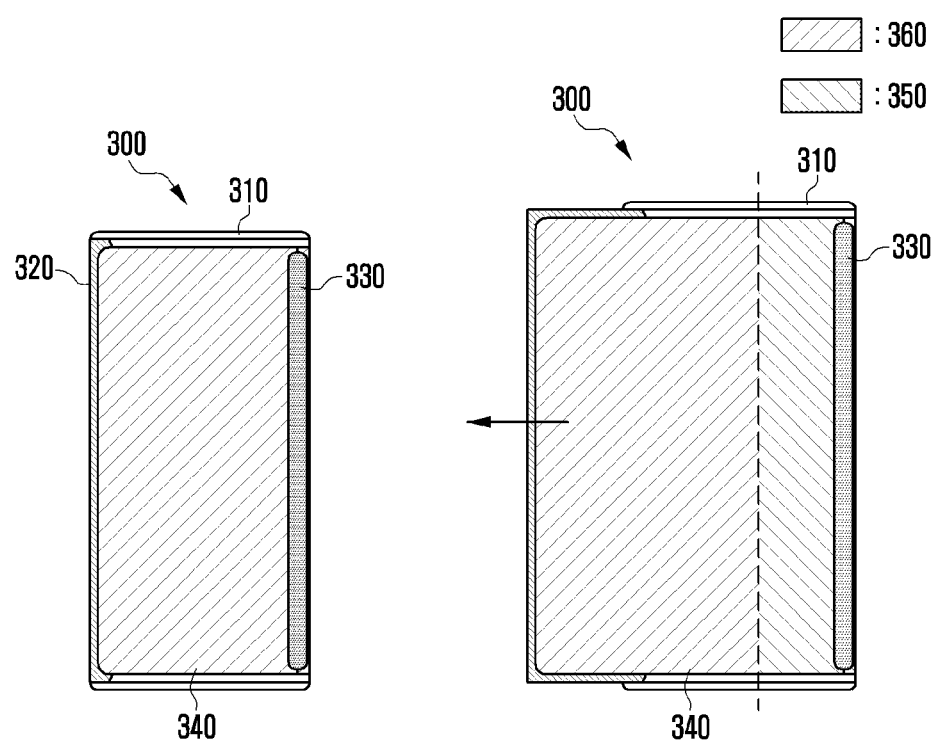
FIG. 3 is a diagram illustrating an example structure of an electronic device in which a display is contracted or expanded according to various embodiments.

FIG. 3 is a diagram illustrating an example structure of an electronic device in which a display is contracted or expanded according to various embodiments.

Referring to FIG. 3, the electronic device 300 (e.g., the electronic device 101 of FIG. 1) may include a main housing 310 fixed regardless of contraction or expansion of the display 340 and a sliding housing 320 involved in contracting or expanding the display 340. As the display 340 is contracted or expanded, a portion of the sliding housing 320 may be drawn into the electronic device 300 or drawn out of the electronic device 300. The display 340 capable of being contracted or expanded may be, for example, a rollable display, a flexible display, or a slidable display, and as the display 340 rotates around a rolling shaft 330, the display 340 may be contracted or expanded. The electronic device 300 may include a display driving circuit (not shown) to contract or expand the display 340.

According to an embodiment, an area when the display 340 is maximally contracted may be referred to as a main area 350, and an area increased as the display 340 is expanded may be referred to as an alpha area 360.

Although FIG. 3 shows a structure in which the display 340 expands from right to left, a direction in which the display 340 expands may not be limited.

Figure 4:
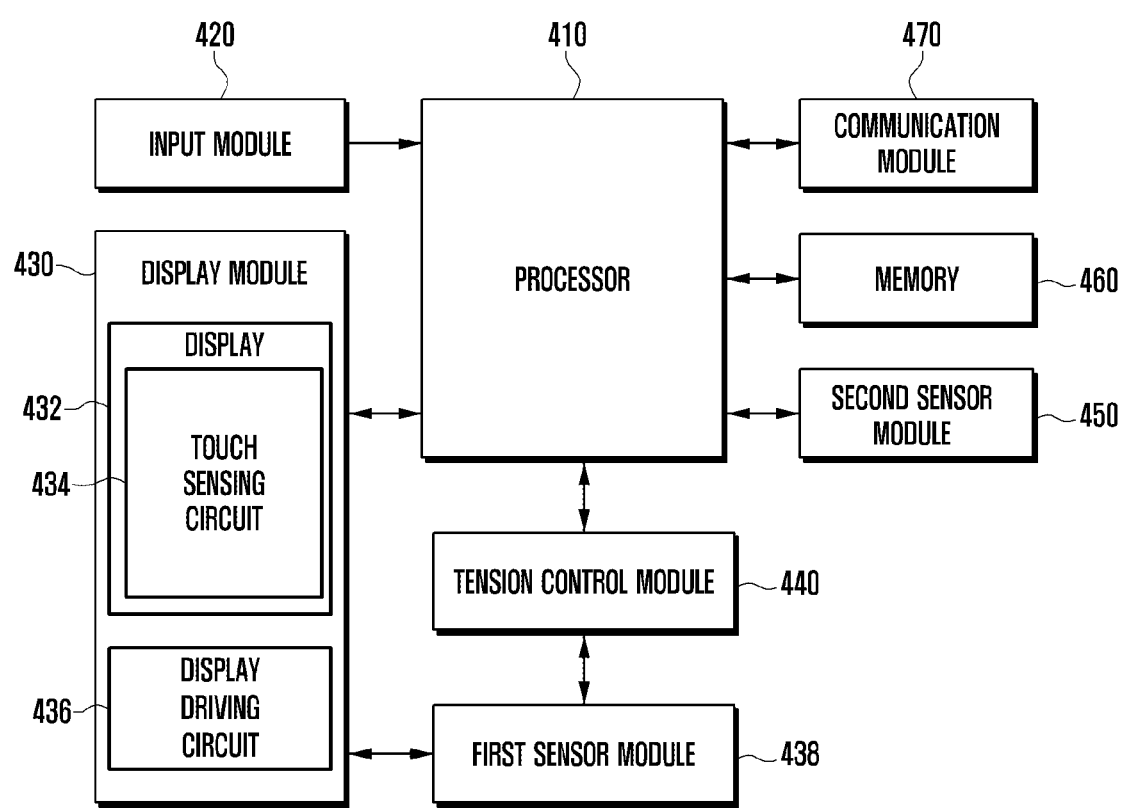
FIG. 4 is a block diagram illustrating an example configuration of the electronic device of FIG. 3 according to various embodiments.

FIG. 4 is a block diagram illustrating an example configuration of the electronic device of FIG. 3 according to various embodiments.

Referring to FIG. 4, in the embodiment, the electronic device 300 may include a processor (e.g., including processing circuitry) 410, an input module (e.g., including input circuitry) 420, a display module (e.g., including a display) 430, a tension control module (e.g., including various processing circuitry and/or executable program instructions and/or a motor) 440, a second sensor module (e.g., including at least one sensor) 450, a memory 460, and a communication module (e.g., including communication circuitry) 470. According to various embodiments, the electronic device 300 may be the electronic device 101 of FIG. 1, or may be configured by including at least some of the components of the electronic device 101 of FIG. 1 or by additionally including other components. According to an embodiment, the electronic device 300 may be configured by omitting some of the components of the electronic device 101 of FIG. 1.

The processor 410 (e.g., the processor 120 of FIG. 1) may include various processing circuitry, such as, for example, and without limitation, a microcontroller unit (MCU), and may control a plurality of hardware components connected to the processor 410 by driving an operating system (OS) or an embedded software program stored in the memory 460 (e.g., the memory 130 of FIG. 1). The processor 410 may control the plurality of hardware components, for example, according to instructions (e.g., the program 140 of FIG. 1) stored in the memory 460.

The input module 420 (e.g., the input module 150 of FIG. 1) may include various input circuitry and receive, for example, a user input. The input module 420 may include, for example, a key input device. According to an embodiment, the key input device may include various types of keys, for example, a physical key, a capacitive key, or an optical key. The input module 420 may include various other types of user interfaces.

The display module 430 (e.g., the display module 160 of FIG. 1) may include, for example, a display 432 and/or a display driving circuit 436.

According to an embodiment, the display 432 may be configured such that a portion thereof is capable of being drawn out from the inside of the electronic device 300. For example, when the electronic device 300 switches from a contracted state to an expanded state, the display 432 may slide out of the inside of the electronic device 300, thereby expanding a screen. When the electronic device 300 switches from the expanded state to the contracted state, the display 432 may slide into the electronic device 300, thereby contracting the screen.

According to an embodiment, the display driving circuit 436 is a circuit for controlling the display 432, and may include, for example, a display driver integrated (DDI) circuit or a DDI chip. According to an embodiment, the display driving circuit 436 may include a touch display driver IC (TDDI) disposed by a chip-on-panel (COP) or chip-on-film (COF) method. The display driving circuit 436 may serve as a signal path between the display 432 and the processor 410.

According to an embodiment, the display 432 may include a touch sensing circuit (or touch sensor) 434. The touch sensing circuit 434 may include, for example, a transmitter (Tx) including a plurality of first electrode lines (or a plurality of driving electrodes) and a receiver (Rx) including a plurality of second electrode lines (or a plurality of receiving electrodes). According to an embodiment, a first sensor module 438 may include at least one sensor and supply a current (e.g., an alternating current) to the touch sensing circuit 434, and an electric field may be formed between the transmitter and the receiver of the touch sensing circuit 434. The first sensor module 438 may convert an analog signal obtained through the touch sensing circuit 434 into a digital signal. For example, when a finger touches the display or approaches within a threshold distance from the display, a change in the electric field may occur, and thus a change in capacitance (or a voltage drop) may occur. When the change in capacitance is equal to or greater than a threshold value, the first sensor module 438 may generate an electrical signal relating to a coordinate on the display as a valid touch input or hovering input, and may output the generated electrical signal to the processor 410. The processor 410 may recognize the coordinate on the screen, based on the electrical signal received from the first sensor module 438.

According to an embodiment, the first sensor module 438 may include at least one sensor and a touch controller integrated circuit (IC). The touch controller IC may perform various functions, such as noise filtering, noise cancelling, and sensing data extraction, in relation to the touch sensing circuit 434. According to various embodiments, the touch controller IC may include various circuits, such as an analog-digital converter (ADC), a digital signal processor (DSP), and/or a microcontroller unit (MCU).

According to an embodiment, the first sensor module 438 may be included in the display module 430 and/or the tension control module 440, and may detect the degree of expansion or contraction of the display. The first sensor module 438 may include at least one of a Hall IC sensor, a pressure sensor, and an inertial sensor disposed on a rolling shaft.

According to an embodiment, the tension control module 440 may include various processing circuitry and/or executable program instructions and adjust tension exerted on the display 432 according to a control signal from the processor 410. The tension control module 440 may include a motor to provide tension exerted on the display 432 and a motor driving circuit (e.g., a motor controller or a motor driver) electrically connected to the motor. The motor driving circuit may control the motor, based on a control signal received from the processor 410, and may adjust the rotation direction, rotation angle, rotation amount, rotation speed, rotation acceleration, or rotation angular velocity of the motor. According to an embodiment, the motor driving circuit may include a motor encoder to detect a driving state of the motor. The motor encoder may include, for example, a disk coupled to a rotating shaft of the motor and a detector capable of detecting the rotation direction, rotation angle, rotation amount, rotation speed, rotation acceleration, or rotation angular velocity of the rotating shaft via electronically recognizable scales and markings on the disk.

According to an embodiment, the second sensor module 450 (e.g., the sensor module 176 of FIG. 1) may include at least one sensor and may, for example, measure a physical quantity or detect an operating state of the electronic device 300, and may generate an electrical signal or a data value corresponding thereto. According to an embodiment, the second sensor module 450 may include, for example, a gesture sensor, a gyro sensor, a barometric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor. According to various embodiments, the second sensor module 450 may further include at least one control circuit to control at least one sensor included therein.

According to an embodiment, the memory 460 (e.g., the memory 130 of FIG. 1) may store an operating system, a user interface, and an application program. In addition, the memory 460 may further store data used by the operating system, the user interface, and the application program. The memory 460 may include a volatile memory and/or a nonvolatile memory.

According to an embodiment, the communication module 470 (e.g., the communication module 190 of FIG. 1) may include various communication circuitry and support the electronic device 300 to communicate with an external electronic device. For example, the communication module 470 may support the electronic device 300 to communicate with a smartwatch or an earphone. The communication module 470 may include a wired communication module and/or a wireless communication module.

Figure 5:
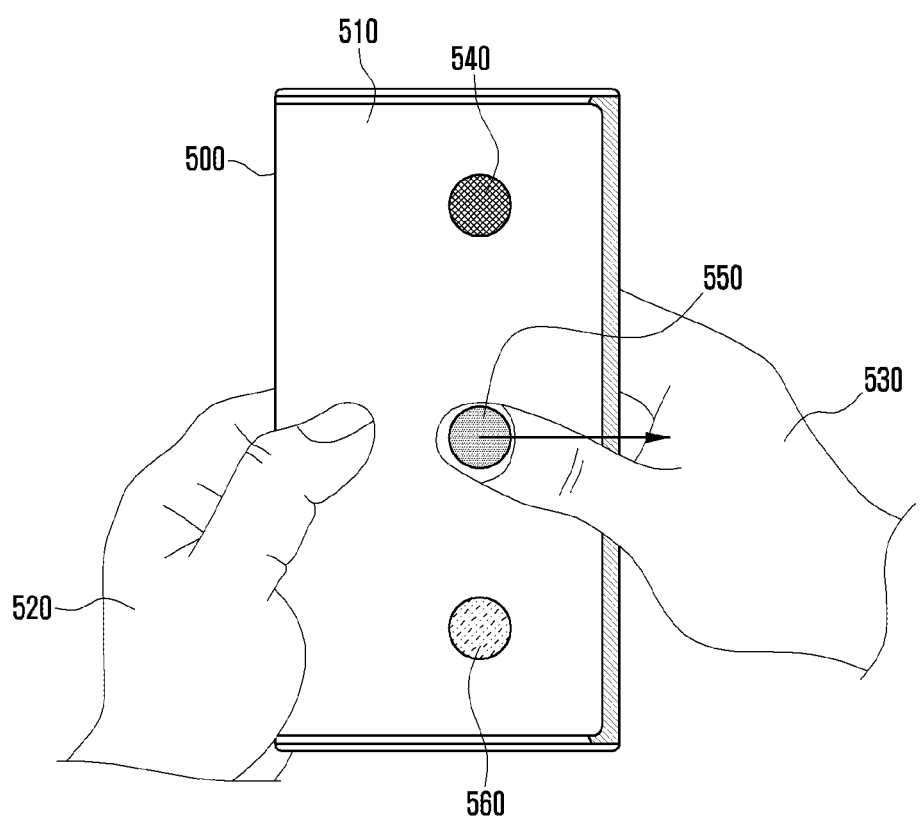
FIG. 5 is a diagram illustrating an example of executing a configured application as a display expands according to various embodiments.

FIG. 5 is a diagram illustrating an example of executing a configured application as a display expands according to various embodiments.

Referring to FIG. 5, the display 510 of an electronic device may expand in a right direction. A user may expand the display 510 of the electronic device. For example, the user may hold the electronic device 500 with one hand 520, and may expand the display 510 with the other hand 530. An operation of the user expanding the display 510 may be an operation performed by the user touching the display 510 with a body part (e.g., a finger) of the user.

According to various embodiments, the electronic device 500 may execute an application configured according to a position where the body part of the user touches the display 510 to expand the display 510. For example, when the display is expanded by a hand of the user touching a first area 540, a first application (e.g., YouTube) may be executed, and when the display is expanded by a hand of the user touching a second area 550, a second application (e.g., Internet) may be executed. In another example, when the display is expanded by a hand of the user touching a third area 560, a displayed screen may be enlarged without executing an application.

According to various embodiments, the electronic device 500 may display an image indicating that the first application (e.g., YouTube) is to be executed while the display 510 is expanded by the body part of the user touching the display 510 to expand the display 510.

Figure 6A:
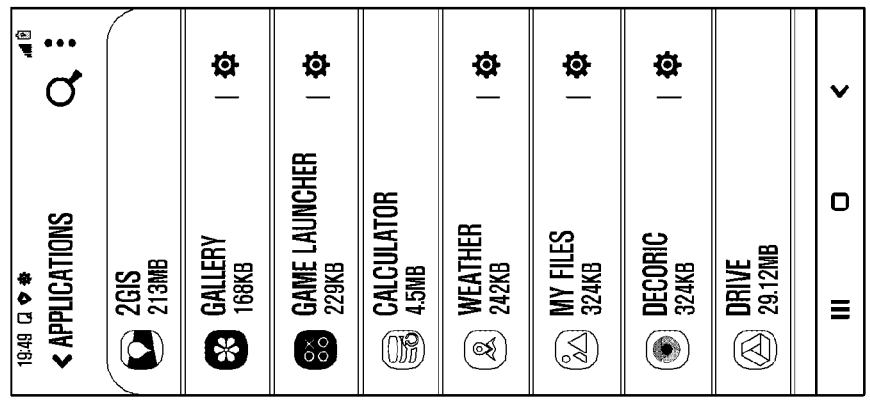
FIGS. 6A, 6B and 6C are diagrams illustrating an example of configuring an application to be executed based on an area touched when expanding a display according to various embodiments.
Figure 6B:
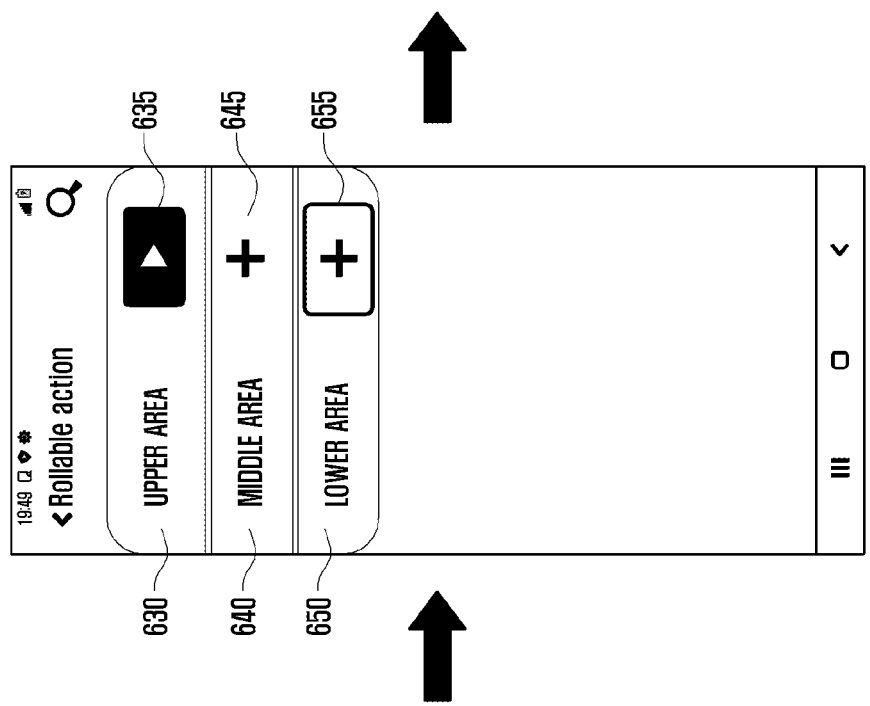
Figure 6C:
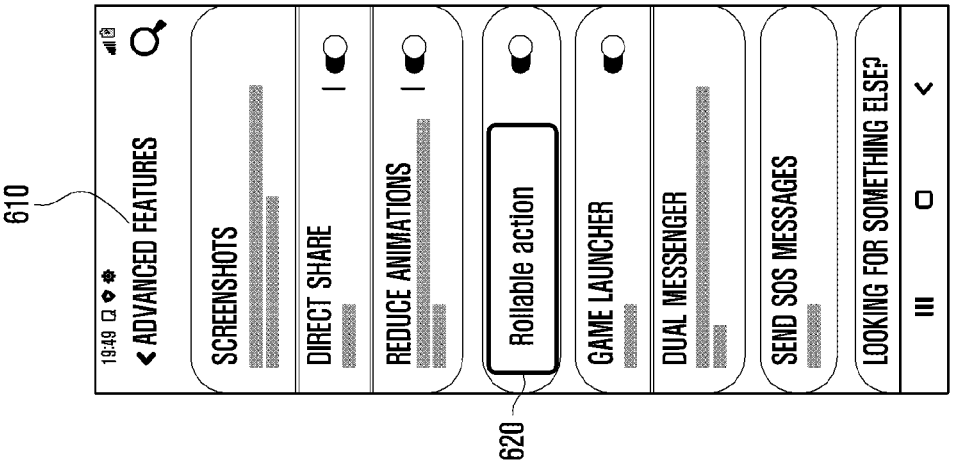

FIGS. 6A, 6B and 6C are diagrams illustrating an example of configuring an application to be executed based on an area touched when expanding a display according to various embodiments.

Referring to FIG. 6A, a menu for configuring an application to be executed according to an area touched when expanding the display may be provided as a submenu (e.g., Rollable action) 620 in a configuration menu (e.g., Advanced features) 610.

When the submenu 620 is selected by a user, a user interface for selecting an application to be executed according to an area touched when expanding the display may be provided as shown in FIG. 6B. Referring to FIG. 6B, the area touched when expanding the display may be divided into an upper area 630, a middle area 640, and a lower area 650, and user interfaces 635, 645, and 655 for selecting an application to be executed by each area may be provided. FIG. 6B shows that an application to be executed is already configured when the touched area is the upper area 630. The user may select an application to be executed by selecting the middle area 640 or the lower area 650. Alternatively, the user may select the application configured for the upper area, and may reselect another application.

FIG. 6C illustrates an example of a screen displayed when the user selects one of the user interfaces 635, 645, and 655 for selecting the application to be executed in (b) of FIG. 6. An electronic device (e.g., the electronic device 500 of FIG. 5) may display an executable application among installed applications. When the user selects one of the displayed applications, the user interface for selecting the application to be executed may display the selected application in FIG. 6B.

Although FIGS. 6A, 6B and 6C show that the area touched when expanding the display is divided into the upper area, the middle area, and the lower area, a user interface enabling a user to directly configure the size and position of the area may be provided. For example, a user who wants to configure a large number of applications may configure a small-sized area, and a user who does not have a frequently used application may configure a large-sized area. In another example, a user may configure an area in consideration of the size of a body part (e.g., the length or thickness of a finger).

Although FIGS. 6A, 6B and 6C illustrate an example of expanding the display, the disclosure may also be applied to a case of contracting the display.

FIG. 7 is a signal flow diagram illustrating an example operation and configuration of an electronic device according to various embodiments.

Referring to FIG. 7, the electronic device (e.g., the electronic device 101 of FIG. 1) may include a function configuration unit (e.g., including various processing circuitry and/or executable program instructions) 710, a database (or memory) 715, a launcher (e.g., including various processing circuitry and/or executable program instructions) 720, a framework 725, a display expansion or contraction determination unit (e.g., including various processing circuitry and/or executable program instructions) 730, a touch driver (e.g., including circuitry) 735, and a touch IC and firmware 740 as components according to a function.

The function configuration unit 710 may configure a function corresponding to a user input, and may store the function in the database 715 in 750. The function corresponding to the user input may be configured differently according to an area where the user input is received on a display. For example, the function configuration unit 710 may set a configuration of executing an Internet application when the user input is received in an upper area among the upper area, a middle area, and a lower area of the display and a configuration of executing a video application when the user input is received in the lower area, and may store the configurations in the database (or memory) 715. In another example, the function configuration unit 710 may set a configuration of executing the Internet application when the user input is received in a left area among the left area, a middle area, and a right area of the display and a configuration of executing the video application when the user input is received in the right area of the display, and may store the configurations in the database (or memory) 715.

When the user input is received, the touch IC and firmware 740 may transmit a location where the user input is received to the touch driver 735 in 752. The user input may not be limited to an input by a body part of the user or an input by a tool. The location where the user input is received may be a relative location or an absolute location. The location where the user input is received may be a coordinate value.

When identifying that the user input has been received, the touch driver 735 may generate and transmit an event to the framework 725 in 754.

When expansion or contraction of the display is detected, the display expansion or contraction determination unit 730 may generate and transmit an event to the framework 725 in 756. According to an embodiment, the event may be either expansion of the display or contraction of the display.

The framework 725 may determine whether to perform the configured function corresponding to the user input using the received events, and may transmit a determination result to the launcher 720 in 758.

The launcher 720 may check the configured function corresponding to the user input in the database 715 to identify the function to be performed in 760. The launcher 720 may transmit a query including at least some of, for example, an area of the display where the user input is received, a shape in which the user input moves, and the expansion or contraction of the display to the database 715.

The database 715 may transmit information about the identified function to the launcher 720 in 762. The database 715 may transmit, for example, a name or a predetermined index of the function to be executed.

The launcher 720 may perform the identified function in 764. According to an embodiment, when the identified function is an application not being executed, the launcher 720 may newly execute the application, and when the identified function is an application being executed, the launcher 720 may move the application to the foreground, and may display the application on the entire screen.

Figure 8:
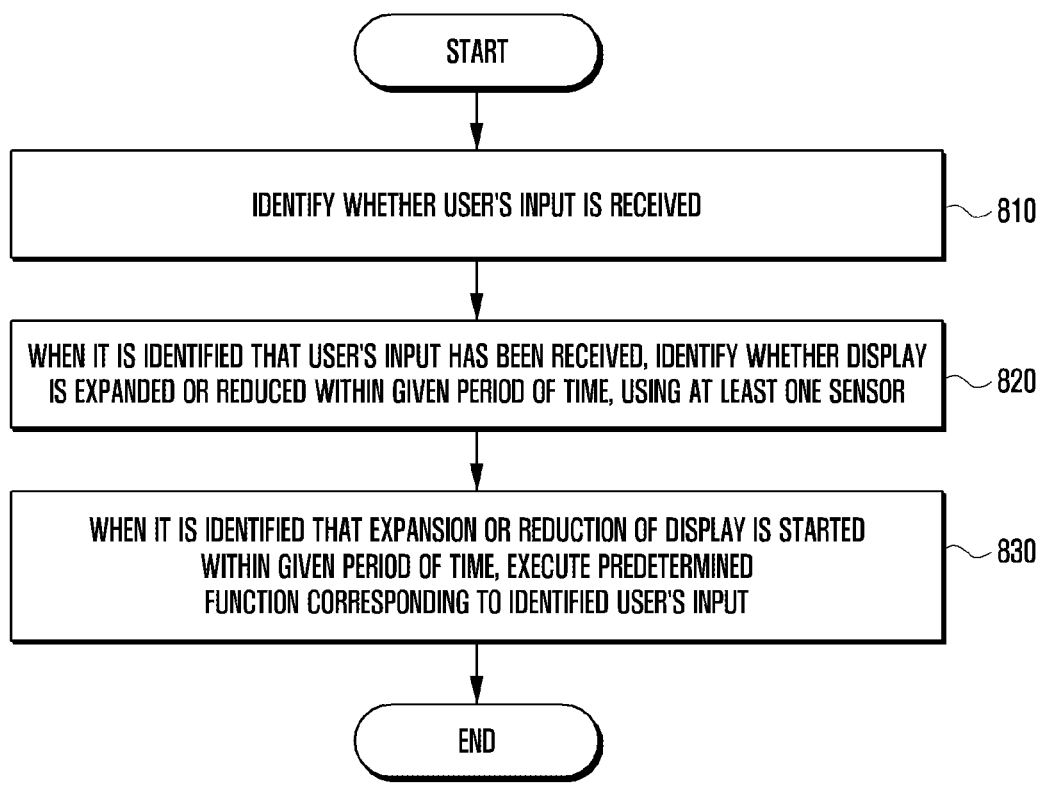
FIG. 8 is a flowchart illustrating an example operation of an electronic device according to various embodiments.

FIG. 8 is a flowchart illustrating an example operation of an electronic device according to various embodiments.

In operation 810, the electronic device (e.g., the electronic device 101 of FIG. 1) may identify whether a user input is received. The electronic device 101 may identify whether the user input is received on a display. The user input may be generated by an operation of a user touching the display (e.g., a touch or pressing).

In operation 820, when identifying that the user input is received, the electronic device 101 may determine whether the display is expanded or contracted within a predetermined time using at least one sensor. According to an embodiment, expansion or contraction of the display may be a state of the display changed by rolling the display. According to an embodiment, an operation of expanding or contracting the display may be performed by force of the user (manually), by an action of the user and force of a motor (semi-automatically), or by force of the motor (automatically). According to an embodiment, the electronic device 101 may determine whether the display expands or contracts by detecting a direction in which the display rolls (or rotates). The electronic device 101 may further determine the degree of rolling of the display (e.g., the length by which the display moves) using another sensor or the same sensor. For example, the electronic device 101 may include a plurality of Hall sensors, and may determine the length by which the display moves using the plurality of Hall sensors.

According to an embodiment, operation 810 and operation 820 may be performed in a reverse order. For example, the electronic device 101 may identify whether the display is expanded or reduced within the predetermined time using at least one sensor, and may determine whether the user input is received.

In operation 830, when identifying that the display starts to be expanded or contracted within the predetermined time, the electronic device 101 may execute a configured function corresponding to the identified user input.

According to an embodiment, when identifying that the display does not start to be expanded or contracted within the predetermined time, the electronic device 101 may not execute the configured function corresponding to the user input. For example, in a case where the user presses (or while pressing) a "back" button while using the Internet with the display of the electronic device 101 reduced and expands the display, when identifying the user input (e.g., a touch of the "back" button) and determining that the display is expanded within the predetermined time (e.g., one second), the electronic device 101 may execute the configured function (e.g., execution of a video application). In another example, when identifying the user input (e.g., the touch of the "back" button) and determining that the display is expanded after the predetermined time (e.g., one second), the electronic device 101 may perform an operation according to the user input (e.g., "back") instead of the configured function (e.g., execution of the video application).

According to an embodiment, the electronic device 101 may identify an area where the user input is received on the display. The configured function corresponding to the user input may be configured in consideration of the area where the user input is received. For example, even though the user input is the same, a different function may be configured depending on where the user input is located on the display (e.g., an upper, middle, lower, or upper-right area). The configured function corresponding to the user input may be configured by the user.

According to an embodiment, the electronic device 101 may identify a shape in which the user input moves on the display. The shape in which the user input moves may be, for example, a shape formed by expansion or contraction of the display. In another example, the shape in which the user input moves may be a shape randomly formed by the user. According to an embodiment, the configured function corresponding to the user input may be configured further in consideration of the shape in which the user input moves. For example, even though the area where the user input is located is the same, when the user input moves in different shapes (e.g., lines with different lengths), different functions may be configured.

According to an embodiment, when the expansion or contraction of the display terminates within a predetermined time, the electronic device 101 may determine that the expansion or contraction of the display is normally terminated. When the expansion or contraction of the display terminates within the predetermined time, the electronic device 101 may perform the configured function corresponding to the identified user input. According to an embodiment, when the expansion or contraction of the display does not terminate within the predetermined time, the electronic device 101 may determine that the expansion or contraction of the display is not normally terminated.

According to an embodiment, the electronic device 101 may determine whether the electronic device 101 is abnormally operating using the user input in operation 810 and/or the expansion or contraction of the display in operation 820. When determining that the electronic device 101 is abnormally operating, the electronic device 101 may not additionally perform any operation. For example, when a time when the user input in operation 810 and/or the expansion or contraction of the display in operation 820 is performed is less than a designated value (e.g., a first threshold value), the electronic device 101 may determine that the electronic device 101 is abnormally operating.

Figure 9:
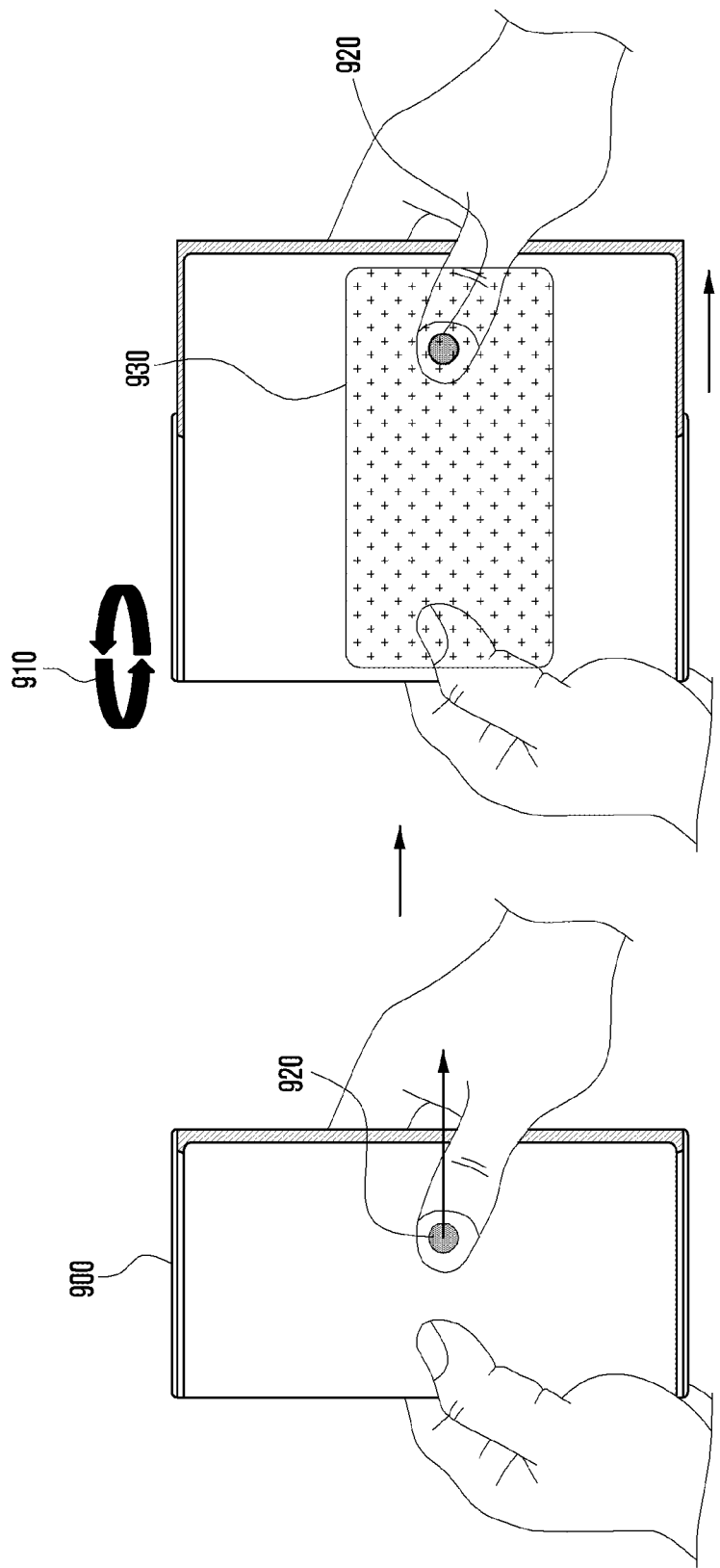
FIG. 9 is a diagram illustrating an example in which an electronic device determines an area of a display where an input is received according to various embodiments.
Figure 10:
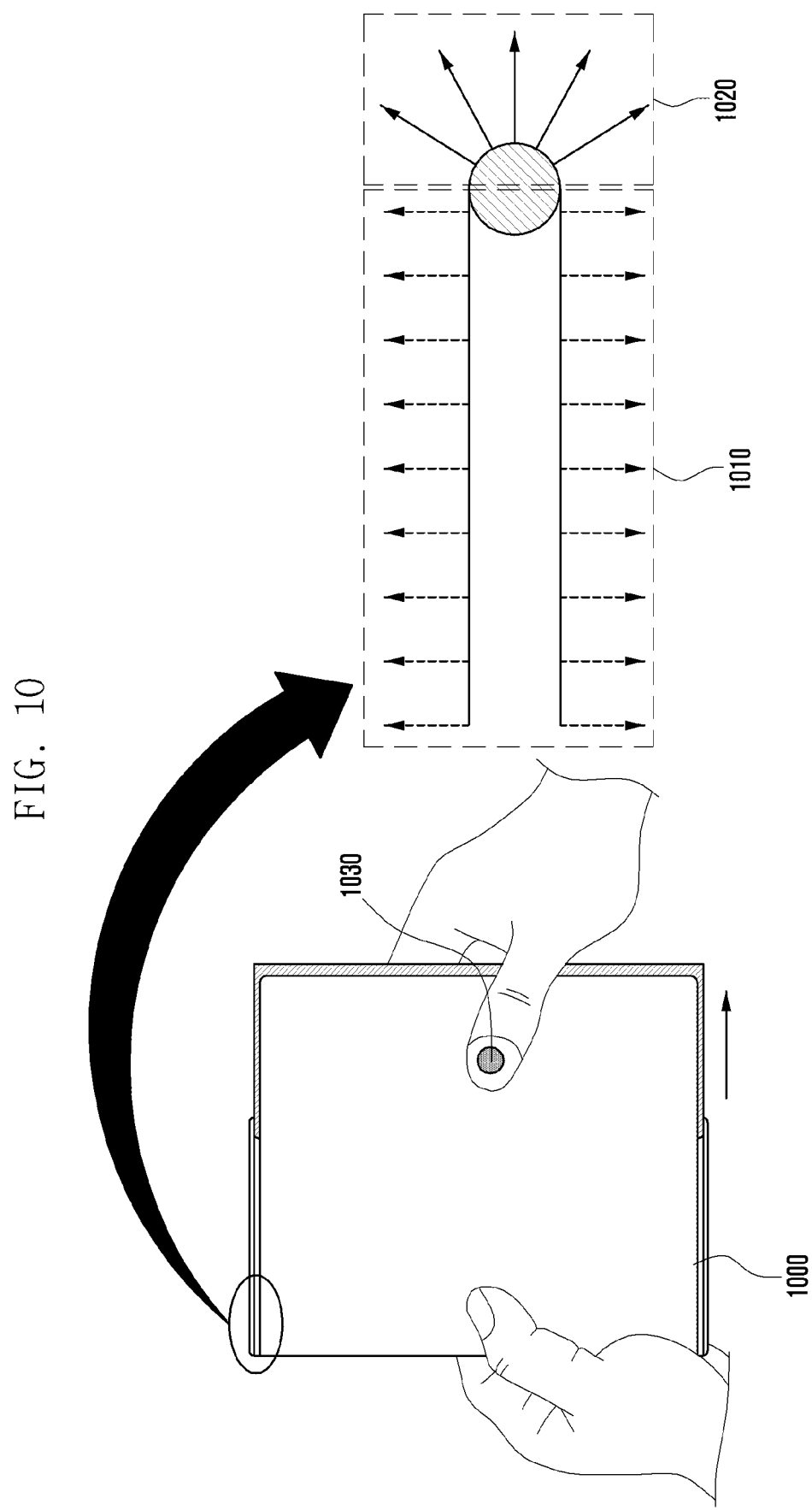
FIG. 10 is a diagram illustrating an example in which an electronic device determines an area of a display where an input is received according to various embodiments.
Figure 11:
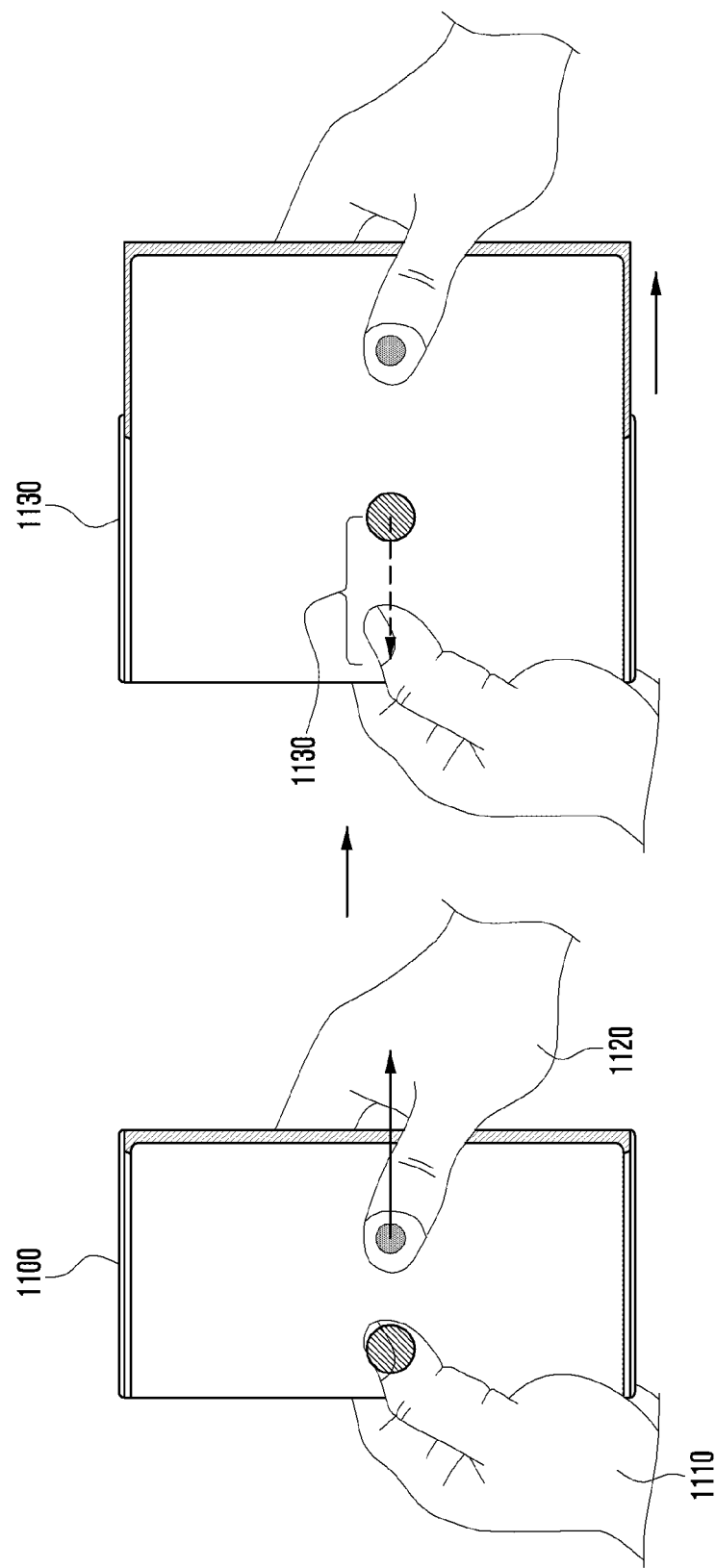
FIG. 11 is a diagram illustrating example in which an electronic device determines an area of a display where an input is received according to various embodiments.

FIGS. 9, 10 and FIG. 11 are diagrams illustrating examples in which an electronic device determines an area of a display where an input is received according to various embodiments.

FIG. 9 is a diagram illustrating an example in which an electronic device determines an area of a display where an input is received according to various embodiments.

When a user holds the electronic device 900 with one hand and expands a display with the other hand as shown in FIG. 9, the electronic device 900 may determine the degree to which the display is expanded using a sensor. For example, the electronic device 900 may rotate the display to expand or contract the display. The electronic device 900 may determine whether the display is expanded/contracted and the degree of expansion/contraction of the display using a sensor that determines a rotation degree 910 of the display. The sensor (e.g., the motor encoder) that determines the rotation degree of the display may be disposed inside or/or outside the electronic device. The electronic device 900 may determine the degree of expansion or contraction of the display determined using the sensor and the location (or coordinates) 920 of the gripping hand of the user, thereby determining an area 930 of the display where an input is received.

FIG. 10 is a diagram illustrating an example in which an electronic device determines an area of a display where an input is received according to various embodiments.

According to various embodiments, in an expandable or contractible display, the touch sensitivity of the display may vary from a part (e.g., a rolled part) 1010 drawn from the inside of the electronic device to a different part (e.g., a flat part) 1020. Using the varying touch sensitivity, the electronic device 1000 (e.g., the electronic device 101 of FIG. 1) may determine a time when the display starts expanding or contracting, the degree of expansion or contraction of the display, and/or a time when the expansion or contraction of the display terminates. The electronic device 1000 may determine the degree of expansion or contraction of the display and the location (or coordinates) 1030 of a gripping hand of a user using the touch sensitivity of the display, thereby determining an area of the display where an input is received.

The electronic device 1000 may determine the degree of expansion or contraction of the display using a Hall IC sensor, a pressure sensor, an inertial sensor disposed on a rolling shaft, a signal transmitted from a display module (capacitive/resistive touch panel or EMR sheet), an optical sensor, and/or motor recognition in addition to methods for detecting the expansion or contraction of the display described with reference to FIG. 9 and FIG. 10.

FIG. 11 is a diagram illustrating an example in which an electronic device determines an area of a display where an input is received according to various embodiments.

According to various embodiments, the electronic device 1100 may distinguish between both hands holding the electronic device 1100. The electronic device 1100 may distinguish between both hands holding the electronic device 1100 even while the display expands or contracts. For example, when the user holds the electronic device 1100 with one hand 1110 and expands the display with the other hand 1120, the electronic device 1100 may distinguish between the location (or coordinates) 1110 of the hand holding the electronic device among the hands of the user and the location (coordinates) 1120 of the hand expanding the display. In an embodiment, the hand used to expand the display may be distinguished from the other hand. In an embodiment, the two hands may be distinguished without distinguishing the roles of the hands.

Referring to FIG. 11, the left hand 1110 of the user may be the hand holding the electronic device 1100, and the right hand 1120 may be the hand expanding the display. Since the right hand 1120 of the user performs a pulling action to expand the display, the coordinates of the right hand may be a fixed value. However, the left hand 1110 of the user holds the electronic device 1100, and may thus be in a state of only touching the display. Accordingly, the coordinates of the left hand may be changed (1130) as the display is expanded.

FIGS. 12A, 12B and 12C are diagrams illustrating an example in which an electronic device recognizes a combination of a plurality of inputs to a display as a user input according to various embodiments.

According to various embodiments, a user may hold the electronic device with both hands to expand or contract a display of the electronic device. For example, the user may hold the electronic device with the left hand, and may expand or contract the display with the right hand. For example, the user may hold the electronic device with the left hand, and may pull or push the display with the right hand.

Referring to FIGS. 12A, 12B and 12C, both hands of the user holding the electronic device may be positioned on the display. For example, the thumbs of both hands may be positioned on the display. The location of a finger and/or the area where the finger contacts the display may vary depending on the size and shape of the electronic device, the size of the hand of the user, or the length and thickness of the finger.

FIGS. 12A, 12B and 12C show, for example, that the display of the electronic device is divided into three areas. As described in FIG. 6, the three areas of the display may be, for example, upper, middle, and lower areas, and both hands of the user may be positioned in one of the upper, middle, and lower areas. For example FIG. 12A and FIG. 12B show examples in which each of the left hand and the right hand is positioned in each of three areas of the display. According to an embodiment, when the hand of the user is on the boundary of an area of the display, an area that is randomly configured or occupied by a larger portion of the hand may be configured as an area where the hand is positioned.

When the display is divided into the three areas, the electronic device may recognize nine user inputs by combining the locations of both hands of the user holding the electronic device as shown in FIG. 12C.

The foregoing embodiments may be applied to an example in which the user holds the electronic device with both hands and expands or contracts the display by force of the user or a combination of the force of the user and mechanical force, such as a motor. According to an embodiment, the electronic device may expand or contract the display without using the force of the user.

FIG. 13 is a diagram illustrating an example in which an electronic device capable of automatically expanding or contracting a display recognizes a user input according to various embodiments.

According to various embodiments, the electronic device 1300 may automatically expand or contract the display using a motor. For example, when a user presses a designated hardware button 1310 of the electronic device or selects a software menu, the electronic device 1300 may automatically expand or contract the display by driving the motor.

According to various embodiments, the user may hold the display even while the display is expanded or contracted. The electronic device 1300 may recognize, as a user input, a hand of the user being positioned (1320) on the display while the display is expanded or contracted as shown in FIG. 13. For example, the electronic device 1300 may identify the location (or coordinates) of the hand of the user positioned on the display while the display is expanded or contracted, and may execute a configured application. In another example, the electronic device 1300 may execute the configured application only when the location of the hand of the user changes on the display while the display is expanded or contracted. In still another example, when expansion or contraction of the display starts, the electronic device 1300 may identify a shape 1330 in which the coordinates of the hand of the user on the display change for a configured time, and may execute the configured application.

According to various embodiments, the electronic device 1300 may recognize a combination of an input (e.g., selection of a hardware key or a software menu) to request expansion or contraction of the display and an input (e.g., a touch by the hand of the user or a touch using a pen) to the display while the display is expanded or contracted as a user input. According to an embodiment, the electronic device 1300 may execute the configured application according to a recognized user input. According to an embodiment, at least one of user inputs may be configured to terminate an application being executed or only to expand or contract the display.

Although an input with the hand of the user has been illustrated above as an example of an input to the display, an input with a stylus pen may also be applied.

An electronic device (e.g., the electronic device 101 of FIG. 1) according to various example embodiments of the disclosure may include: an expandable or contractible display (e.g., the display module 430 of FIG. 4), at least one sensor (e.g., the second sensor module 450 of FIG. 4), and a processor (e.g., the processor 410 of FIG. 4), wherein the processor may be configured to: identify whether an input is received, identify whether the display is expanded or contracted within a specified time using the at least one sensor based on identifying that the input is received, and execute a configured function corresponding to the identified input based on identifying that the display starts to be expanded or contracted within the predetermined time.

The processor of the electronic device according to various example embodiments of the disclosure may be configured to not execute the configured function corresponding to the input based on identifying that the display does not start to be expanded or contracted within the specified time.

The processor of the electronic device according to various example embodiments of the disclosure may be configured to identify an area in which the input is received on the display, and execute the configured function in further consideration of the identified area.

In the electronic device according to various example embodiments of the disclosure, the configured function corresponding to the input may include a function configured by distinguishing the area of the display.

The processor of the electronic device according to various example embodiments of the disclosure may be configured to identify a shape in which the input moves on the display, and execute the configured function in further consideration of the identified shape.

In the electronic device according to various example embodiments of the disclosure, the shape in which the input moves on the display may be a shape formed by expansion or contraction of the display.

The processor of the electronic device according to various example embodiments of the disclosure may be configured to identify whether the display is expanded or contracted using a direction in which the display rotates.

The processor of the electronic device according to various example embodiments of the disclosure may be configured to further identify a length by which the display is expanded or contracted using a touch sensitivity of the display.

The electronic device according to various example embodiments of the disclosure may further include a motor (e.g., the tension control module 440 of FIG. 4), and the processor may be configured to expand or contract the display using the motor.

The processor of the electronic device according to various example embodiments of the disclosure may be configured to further identify whether expansion or contraction of the display terminates within a specified time, and may execute the configured function corresponding to the identified input based on the expansion or contraction of the display terminating within the specified time.

A method of operating an electronic device including an expandable or contractible display according to various example embodiments of the disclosure may include identifying whether a user input is received (e.g., operation 810 of FIG. 8), identifying whether: the display is expanded or contracted within a specified time using at least one sensor based on identifying that the input is received (e.g., operation 820 of FIG. 8), and executing a configured function corresponding to the identified input (e.g., operation 830 of FIG. 8) based on identifying that the display starts to be expanded or contracted within the specified time.

The method of operating the electronic device including the expandable or contractible display according to various example embodiments of the disclosure may further include: not executing the configured function corresponding to the input based on identifying that the display does not start to be expanded or contracted within the specified time.

The method of operating the electronic device including the expandable or contractible display according to various example embodiments of the disclosure may further include: identifying an area in which the input is received on the display, and the executing of the configured function corresponding to the identified input may include executing the configured function in further consideration of the identified area.

In the method of operating the electronic device including the expandable or contractible display according to various example embodiments of the disclosure, the configured function corresponding to the input may be a function configured by distinguishing the area of the display.

The method of operating the electronic device including the expandable or contractible display according to various example embodiments of the disclosure may further include identifying a shape in which the input moves on the display, and the executing of the configured function corresponding to the identified input may include executing the configured function in further consideration of the identified shape.

In the method of operating the electronic device including the expandable or contractible display according to various example embodiments of the disclosure, the shape in which the input moves on the display may be a shape formed by expansion or contraction of the display.

In the method of operating the electronic device including the expandable or contractible display according to various example embodiments of the disclosure, the identifying whether the display is expanded or contracted may include identifying whether the display is expanded or contracted using a direction in which the display rotates.

The method of operating the electronic device including the expandable or contractible display according to various example embodiments of the disclosure may further include identifying a length by which the display is expanded or contracted using a touch sensitivity of the display.

In the method of operating the electronic device including the expandable or contractible display according to various example embodiments of the disclosure, the display may be expanded or contracted using a motor.

The method of operating the electronic device including the expandable or contractible display according to various example embodiments of the disclosure may further include identifying whether expansion or contraction of the display terminates within a specified time, and the executing of the configured function corresponding to the identified input may include executing the configured function corresponding to the identified input based on the expansion or contraction of the display terminating within the specified time.

A method of operating an electronic device including an expandable or contractible display according to various example embodiments of the disclosure may include identifying whether an input is received, identifying whether the display is expanded or contracted within a specified time using at least one sensor based on identifying that the input is received, and executing a configured function corresponding to the identified user input based on identifying that expansion or contraction of the display terminates within the specified time.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
an expandable or contractible display;
at least one sensor; and
at least one processor comprising processor circuitry;
memory storing instructions;
wherein the instructions, when executed by the at least one processor, cause the electronic device to:
divide the display into a plurality of areas;
set different functions to be executed based on the divided areas;
identify whether an input is received;
identify an area among the plurality of areas that includes the position where the identified input is received;
identify whether the display is expanded and/or contracted within a specified time using the at least one sensor; and
execute a function, set based on the identified area, based on identifying that the input is received and that the display starts to be expanded and/or contracted within the specified time.

2. The electronic device of claim 1, wherein the instructions, when executed by the at least one processor, individually and/or collectively, cause the electronic device not to execute the function, set based on the identified area, based on identifying that the display does not start to be expanded and/or contracted within the specified time.

3. The electronic device of claim 1, wherein the instructions, when executed by the at least one processor, individually and/or collectively, cause the electronic device to:
identify a shape in which the input moves on the display; and
execute the function in further consideration of the identified shape.

4. The electronic device of claim 3, wherein the shape in which the user input moves on the display is a shape formed by expansion and/or contraction of the display.

5. The electronic device of claim 1, wherein the instructions, when executed by the at least one processor, cause the electronic device to identify whether the display is expanded and/or contracted using a direction in which the display rotates.

6. The electronic device of claim 5, wherein the instructions, when executed by the at least one processor, individually and/or collectively, cause the electronic device to further identify a length by which the display is expanded and/or contracted using a touch sensitivity of the display.

7. The electronic device of claim 1, further comprising a motor,
wherein the instructions, when executed by the at least one processor, individually and/or collectively, cause the electronic device to expand and/or contract the display using the motor.

8. The electronic device of claim 1, wherein the instructions, when executed by the at least one processor, individually and/or collectively, cause the electronic device to:
identify whether expansion and/or contraction of the display terminates within a specified time; and
execute the function corresponding to the identified input based on the expansion and/or contraction of the display terminating within the specified time.

9. The electronic device of claim 1, wherein the function is an application, and wherein the application is configured according to the position on the display where the identified input is received.

10. A method of operating an electronic device comprising an expandable or contractible display, the method comprising:
dividing the display into a plurality of areas;
setting different functions to be executed based on the divided areas;
identifying whether an input is received;
identifying an area among the plurality of areas that includes the position where the identified input is received;

identifying whether the display is expanded and/or contracted within a specified time using at least one sensor; and executing a function, set based on the identified area, based on identifying that the input is received and that the display starts to be expanded and/or contracted within the specified time.

11. The method of claim 10, further comprising not executing the function, set based on the identified area, based on identifying that the display does not start to be expanded and/or contracted within the specified time.

12. The method of claim 10, further comprising identifying a shape in which the input moves on the display,
wherein the executing of the function corresponding to the identified input comprises executing the function in further consideration of the identified shape.

13. The method of claim 10, wherein the function is an application, and wherein the application is configured according to the position on the display where the identified input is received.

* * * * *